United States Patent
Achleitner et al.

(10) Patent No.: US 10,508,619 B2
(45) Date of Patent: Dec. 17, 2019

(54) METHOD AND A CONTROL DEVICE FOR OPERATING A TANK VENTING SYSTEM OF AN INTERNAL COMBUSTION ENGINE

(71) Applicant: Continental Automotive GmbH, Hannover (DE)

(72) Inventors: Erwin Achleitner, Obertraubling (DE); Gerhard Haft, Lappersdorf (DE); Roland Haufler, Regensburg (DE); Manfred Weigl, Sinzing (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 22 days.

(21) Appl. No.: 16/019,305

(22) Filed: Jun. 26, 2018

(65) Prior Publication Data
US 2018/0372030 A1    Dec. 27, 2018

(30) Foreign Application Priority Data
Jun. 27, 2017  (DE) .......................... 10 2017 210 768

(51) Int. Cl.
*F02M 25/08*    (2006.01)
*F02D 41/00*    (2006.01)
*F02D 41/14*    (2006.01)

(52) U.S. Cl.
CPC ..... *F02M 25/0854* (2013.01); *F02D 41/0002* (2013.01); *F02D 41/0042* (2013.01);
(Continued)

(58) Field of Classification Search
CPC .......... F02M 25/0854; F02M 25/0836; F02M 25/089; F02D 41/1459; F02D 41/0042;
(Continued)

(56) References Cited

U.S. PATENT DOCUMENTS

| 7,966,996 B1* | 6/2011 | Pursifull | F02M 25/0836 123/518 |
| 8,297,263 B2* | 10/2012 | Pursifull | F02M 25/0836 123/518 |

(Continued)

FOREIGN PATENT DOCUMENTS

| DE | 19650517 A1 | 6/1998 | F02M 25/08 |
| DE | 102010054668 A1 | 6/2012 | F02B 33/40 |

(Continued)

OTHER PUBLICATIONS

German Office Action, Application No. 102017210768.5, 7 pages, dated Feb. 1, 2016.
(Continued)

*Primary Examiner* — Hai H Huynh
(74) *Attorney, Agent, or Firm* — Slayden Grubert Beard PLLC

(57) ABSTRACT

Various embodiments may include a method and a control device for operating a tank venting system of an internal combustion engine. For example, a method for operating an engine may include: activating a scavenge air pump disposed in a regeneration line with a fuel vapor retention filter; upon reaching a constant speed of an impeller of the scavenge air pump conveying the scavenge air, detecting a pressure upstream of the scavenge air pump and a pressure downstream of the scavenge air pump; calculating a differential pressure across the scavenge air pump; determining the degree of loading of the fuel vapor retention filter based at least in part on the differential pressure; and adjusting a fuel injection time based on the degree of loading.

9 Claims, 2 Drawing Sheets

(52) U.S. Cl.
CPC ..... *F02D 41/0045* (2013.01); *F02D 41/1459* (2013.01); *F02M 25/089* (2013.01); *F02M 25/0836* (2013.01); *F02D 2200/0406* (2013.01)

(58) Field of Classification Search
CPC ............. F02D 41/0002; F02D 41/0045; F02D 2200/0406
USPC ....... 123/497, 446, 457, 461, 479, 480, 518, 123/510, 511; 701/102, 103
See application file for complete search history.

(56) References Cited

U.S. PATENT DOCUMENTS

| | | |
|---|---|---|
| 9,556,828 B2 | 1/2017 | Weigl |
| 2007/0137622 A1 | 6/2007 | Koyama ................ 123/520 |
| 2013/0255645 A1 | 10/2013 | Grass et al. .............. 123/520 |
| 2014/0245997 A1 | 9/2014 | Zhelyaskov et al. ......... 123/519 |
| 2017/0159588 A1 | 6/2017 | Honjo ................... 123/520 |
| 2018/0216578 A1 | 8/2018 | Wodausch et al. |

FOREIGN PATENT DOCUMENTS

| | | | |
|---|---|---|---|
| DE | 102017201530 A1 | 8/2018 | ........... B60K 15/035 |
| DE | 112017001080 T5 | 11/2018 | ............. F02M 25/08 |
| EP | 2627889 B1 | 10/2014 | ............. F02D 29/02 |
| JP | 2017106334 A | 6/1917 | ............. F02D 45/00 |
| JP | 2007170221 A | 7/2007 | ............. F02M 25/08 |

OTHER PUBLICATIONS

Korean Office Action, Application No. 20180073603, 7 pages, dated Mar. 26, 2019.
German Office Action, Application No. 102017210768.5, 6 pages, dated Jan. 4, 2019.

* cited by examiner

METHOD AND A CONTROL DEVICE FOR OPERATING A TANK VENTING SYSTEM OF AN INTERNAL COMBUSTION ENGINE

CROSS-REFERENCE TO RELATED APPLICATIONS

This application claims priority to DE Application No. 10 2017 210 768.5 filed Jun. 27, 2017, the contents of which are hereby incorporated by reference in their entirety.

TECHNICAL FIELD

The present disclosure relates to internal combustion engines. Various embodiments may include a method and a control device for operating a tank venting system of an internal combustion engine.

BACKGROUND

To limit pollutant emissions, modern motor vehicles powered by internal combustion engines are equipped with fuel vaporization restraint systems, commonly referred to as tank venting devices. The purpose of such devices is to accommodate and temporarily store fuel vapor that forms in a fuel tank as a result of vaporization, so that the fuel vapor cannot escape into the environment. As storage for the fuel vapor, a fuel vapor retention filter is provided in the fuel vaporization restraint system; this uses, for example, activated carbon as a storage medium. The fuel vapor retention filter has only a limited storage capacity for fuel vapor. In order to be able to use the fuel vapor retention filter over a long period of time, it must be regenerated. For this purpose, a controllable tank venting valve is arranged in a line between the fuel vapor retention filter and an intake manifold pipe of the internal combustion engine, which valve is opened for executing the regeneration, so that on the one hand the fuel vapors adsorbed in the fuel vapor retention filter escape into the intake manifold pipe as a result of the reduced pressure in the latter, and so are fed into the intake air of the internal combustion engine, and thus to the combustion process, and on the other hand, the adsorption capacity of the fuel vapor retention filter for fuel vapor is restored.

A regeneration process of the fuel vapor retention filter is therefore only possible if a reduced pressure prevails in the intake manifold pipe relative to the tank venting device. New vehicle concepts with hybrid drive and start/stop functionality are a means of complying with legislated emission values and reducing fuel consumption. At the same time, however, these lead to a significant reduction in the scavenge rates for the regeneration of the fuel vapor retention filter, since the effective time in which the internal combustion engine can be scavenged is reduced by the temporary shutdown of the internal combustion engine. Furthermore, the dethrottling of the internal combustion engines as a result of the elimination of the throttle valve, and the control of the incoming airflow using the intake valves (VVT, variable valve train) and/or exhaust gas turbocharging leads to the fact that the reduced pressure in the intake manifold pipe required for the scavenging of the fuel vapor retention filter is no longer sufficient.

In DE 10 2010 054 668 A1 an internal combustion engine is described with a fuel tank, a fuel vapor store for storing fuel vapors that escape from the fuel tank, a connecting line between the fuel vapor store, and an air intake manifold of the internal combustion engine to lead fuel vapors from the fuel vapor store into the air intake manifold during a regeneration phase, a valve arranged in the connecting line, a venting line for the fuel vapor store and a valve unit arranged in the venting line for controlling the venting of the fuel vapor store. A scavenge air pump is arranged in the venting line for the fuel vapor store; this is integrated into the valve unit for controlling the venting of the fuel vapor store. In this way, a particularly effective scavenging and regeneration of the fuel vapor store is achieved, even if no or a slightly reduced pressure, is provided by the air intake manifold.

During the tank venting process, an additional fuel fraction enters the combustion chamber of the internal combustion engine from the fuel vapor retention filter when the gas inlet valve is open. In order to ensure correct operation of the internal combustion engine and compliance with exhaust gas limits, this fuel fraction must be taken into account in the total amount of fuel to be supplied as calculated by the engine control unit for the instantaneous operating point of the internal combustion engine. For the control of the scavenge flow and the injection correction, knowledge that is as accurate as possible of the vaporous fuel fraction (HC/air mixture from the fuel vapor retention filter), that is to say, the degree of loading of the fuel vapor retention filter, is thus necessary.

The determination of the degree of loading is carried out in conventional systems by evaluating the signal deviation of a lambda probe arranged in the exhaust gas manifold upstream of an exhaust gas catalytic converter as the tank venting valve is slowly opened. Since deviations of the lambda probe signal can also be attributed to other causes, for example, as a result of a load change, determination of the degree of loading based on this signal deviation may lead to erroneous results. The consequence of this is an erroneous calculation of the quantity injected, which can lead to increased exhaust emissions, increased fuel consumption and poorer drivability. In addition, only very little HC gas can be regenerated during this relatively long learning phase.

A method and a device for the operation of a tank venting system for an internal combustion engine are described in EP 2 627 889 B1. The tank venting system has an adsorption tank, a regeneration passage, and an electrically driven pump. The adsorption tank is used for the collection and intermediate storage of fuel vapors emerging from a fuel tank, wherein a scavenge airflow can flow through the adsorption tank. The regeneration passage connects the adsorption tank with an intake passage. A pump is arranged in the regeneration passage, which is designed to suck the scavenge air out of the adsorption tank and to add it to an intake air in the intake passage. A density of the scavenge air flowing in the regeneration passage is determined. Furthermore, a scavenge air mass flow rate flowing in the regeneration passage is determined, which is dependent on the density of the scavenge air and a predetermined pump characteristic of the pump.

SUMMARY

The teachings of the present disclosure may include a method and a control device with which the loading of a fuel vapor retention filter in a fuel vaporization restraint system of an internal combustion engine can be accurately determined in a simple manner. For example, some embodiments include a method for determining the loading of a fuel vapor retention filter (61) in a fuel vaporization restraint system (6) of an internal combustion engine (100). The fuel vaporization restraint system (6) has at least: a fuel storage tank (5) for storing fuel (KST), a connecting line (63), which couples the fuel storage tank (5) to the fuel vapor retention filter (61), a regeneration line (65), which couples the fuel vapor retention filter (61) to an intake manifold (1) of the internal combustion engine (100), and in which is arranged an electrically controllable flow control valve (66), a venting line (68), which couples the fuel vapor retention filter (61) to the atmosphere, and an electrically controllable scavenge air pump (67) arranged in the regeneration line (65), so that scavenge air can be led through the fuel vapor retention filter (61) and supplied to the intake manifold (1) for regeneration of the fuel vapor retention filter (61). In operation, the scavenge air pump (67) is switched on. Upon reaching a constant speed of the impeller of the scavenge air pump (67) conveying the scavenge air, a value is detected for the pressure (p_up) in the regeneration line (65) upstream of the scavenge air pump (67) and a value is detected for the pressure (p_down) in the regeneration line (65) downstream of the scavenge air pump (67). From these pressure values (p_up, p_down) a value for a differential pressure ($\Delta$APP) is determined across the scavenge air pump (67). A value for the degree of loading (HC_KONZ) of the fuel vapor retention filter (61) is assigned to the value for the differential pressure ($\Delta$APP).

In some embodiments, the degree of loading (HC_KONZ) is determined when the internal combustion engine (100) is stationary and the flow control valve (66) is closed, and this value for the degree of loading (HC_KONZ) is already taken into account in the first injection time calculation when starting the internal combustion engine (100).

In some embodiments, the degree of loading (HC_KONZ) is determined with the internal combustion engine (100) running and the flow control valve (66) open. The flow control valve (66) is controlled by means of a pulse width modulated activation signal and the evaluation of the differential pressure value ($\Delta$APP) takes place at a sampling rate that is synchronous with the control of the flow control valve (66).

In some embodiments, the assignment takes place by means of a characteristics map (KF) stored in a control device (8) controlling and/or regulating the internal combustion engine (100). In some embodiments, the values for the degree of loading (HC_KONZ) stored in the characteristics map (KF) are determined on the test bed.

In some embodiments, the pressure values (p_up, p_down) are supplied by two separate pressure sensors (71, 72), and the value for the differential pressure ($\Delta$APP) is obtained by formation of the difference between the two pressure values (p_up, p_down).

In some embodiments, the value for the differential pressure ($\Delta$APP) is obtained by a differential pressure sensor (73) whose fluid connections open out into the regeneration line (65) upstream and downstream of the scavenge air pump (67).

As another example, some embodiments may include a control device (8) for determining the loading of a fuel vapor retention filter (61) in a fuel vaporization restraint system (6) of an internal combustion engine (100). The fuel vaporization restraint system (6) has at least: a fuel storage tank (5) for storing fuel (KST), a connecting line (63), which couples the fuel storage tank (5) to the fuel vapor retention filter (61), a regeneration line (65), which couples the fuel vapor retention filter (61) to an intake manifold (1) of the internal combustion engine (100), and in which is arranged an electrically controllable flow control valve (66), a venting line (68), which couples the fuel vapor retention filter (61) to the atmosphere, and an electrically controllable scavenge air pump (67) arranged in the regeneration line (65), so that scavenge air can be led through the fuel vapor retention filter (61) and supplied to an intake manifold (1) of the internal combustion engine (100) for regeneration of the fuel vapor retention filter (61), and a pressure sensor arrangement (71, 72; 73) for determining pressure values (p_up, p_down, ($\Delta$APP) upstream and downstream of the scavenge air pump (67). The control device (8) is designed so as to carry out a method as described above.

BRIEF DESCRIPTION OF THE DRAWINGS

An exemplary embodiment of the teachings herein is illustrated in the drawing and will be explained in more detail with reference to the following description. Here.

DETAILED DESCRIPTION

Figure 1:
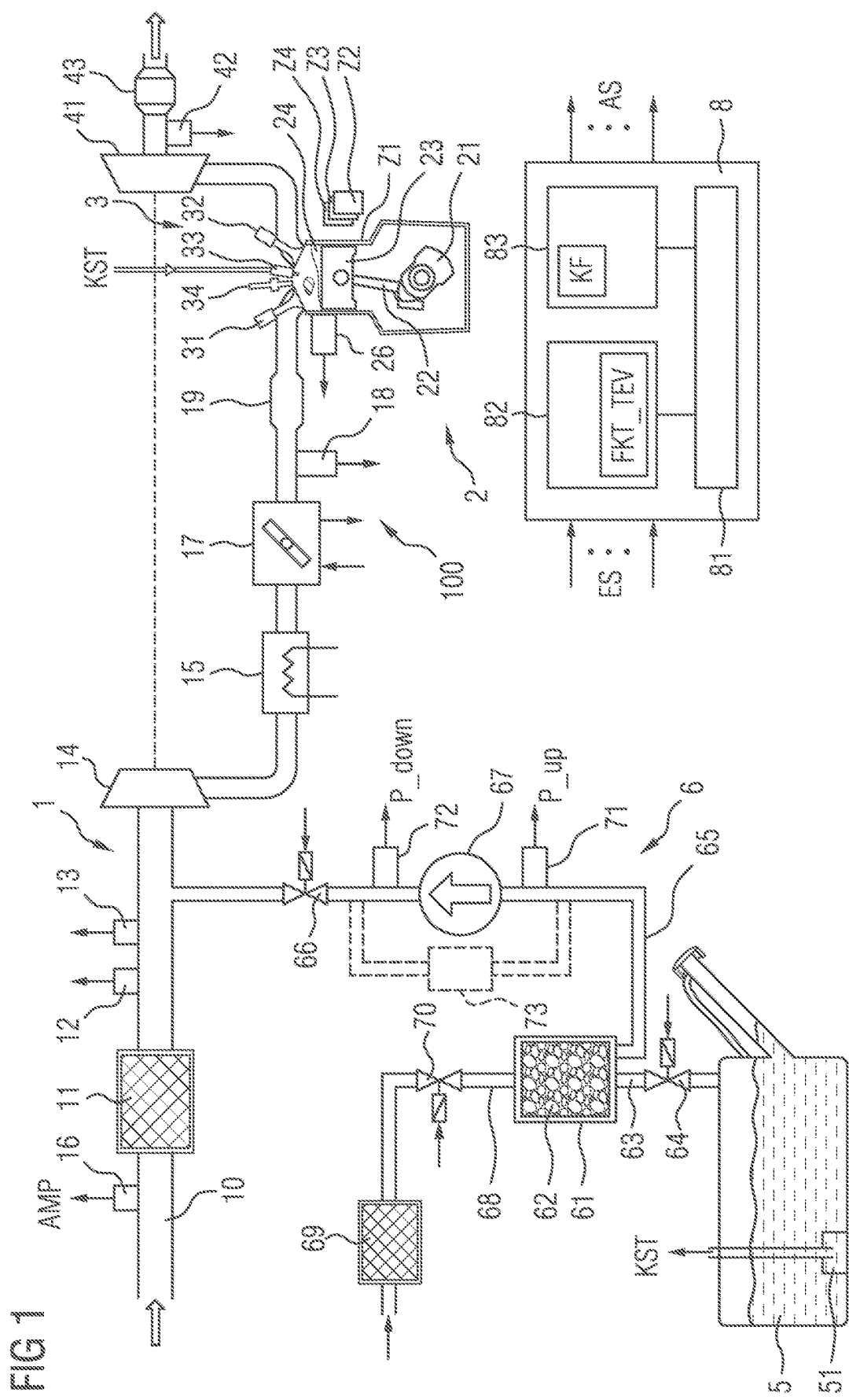
FIG. 1 shows in a simplified representation an internal combustion engine with a tank venting system, in accordance with the teachings herein.

Various embodiments may include a method and/or an appropriate control device for determining the loading of a fuel vapor retention filter in a fuel vaporization restraint system of an internal combustion engine. The fuel vaporization restraint system has at least: a fuel storage tank for storing fuel, a connecting line which couples the fuel storage tank to the fuel vapor retention filter, a regeneration line, which couples the fuel vapor retention filter to an intake manifold of the internal combustion engine, and in which is arranged an electrically controllable flow control valve, a venting line, which couples the fuel vapor retention filter to the atmosphere, an electrically controllable scavenge air pump arranged in the regeneration line, so that scavenge air can be led through the fuel vapor retention filter and supplied to the intake manifold of the internal combustion engine for regeneration of the fuel vapor retention filter, wherein the scavenge air pump is switched on and, upon reaching a constant speed of the impeller of the scavenge air pump conveying the scavenge air, a value is detected for the pressure in the regeneration line upstream of the scavenge air pump and a value is detected for the pressure in the regeneration line downstream of the scavenge air pump, and from these pressure values a value for a differential pressure is determined across the scavenge air pump. A value for the degree of loading of the fuel vapor retention filter is then assigned to the differential pressure.

At a predetermined speed of the scavenge air pump the pressure generated by the scavenge air pump depends on the density of the medium to be conveyed, that is to say, on the density of the HC/air mixture from the fuel vapor retention filter. Depending on the degree of loading and thus on the composition of the scavenge flow, different densities of the scavenge flow ensue. Since the densities of air and hydrocarbons (HC) differ significantly, the hydrocarbon concentrations (HC concentrations), that is to say, the degree of loading of the fuel vapor retention filter, can be inferred in a simple manner by detecting and evaluating the pressure values upstream and downstream of the scavenge air pump.

If the determination of the load as described is carried out before the actual scavenging phase, e.g., before the regeneration of the fuel vapor retention filter and with the flow control valve closed, the initial opening of the flow control valve can take place significantly faster and with a more precise injection correction on the basis of the vaporous fuel supplied from that of the fuel vapor retention filter. By this means an increase in the scavenge rate can take place with lower lambda drifts, and drivability problems are also minimized.

In some embodiments, the degree of loading is determined with the internal combustion engine running and the flow control valve open, wherein the flow control valve is controlled by means of a pulse width modulated activation signal and the evaluation of the differential pressure value takes place at a sampling rate that is synchronous with the control of the flow control valve. By such a synchronous differential pressure measurement, the pressure and thus the HC concentration in the scavenge gas can be determined in all scavenge phases, even with a closed, fully open or pulse width modulated activation signal for the flow control valve.

A particularly simple determination of the HC concentration corresponding to the degree of loading ensues, if the relationship between pressure difference and degree of loading is stored in a characteristics map within a memory of a control device controlling and/or regulating the internal combustion engine, wherein the relationship is determined on the test bed. Since for determining the degree of loading only two commercially available pressure sensors are required as hardware components, or, in another embodiment, only a single differential pressure sensor, the overall result is a very simple and inexpensive solution that provides a reliable and accurate result.

FIG. 1 shows a schematic sketch of an internal combustion engine with a fuel vaporization restraint system, a charging device in the form of an exhaust gas turbocharger, and a control device. In the interests of clarity, only those parts are drawn that are necessary for an understanding of the teachings herein. In particular, only one cylinder of the internal combustion engine is shown.

The internal combustion engine 100 comprises an intake manifold 1, an engine block 2, a cylinder head 3, and an exhaust gas manifold 4. In the direction of flow of the intake air, the intake manifold 1, starting from an intake opening 10, may comprise, in succession, an ambient air pressure sensor 16, an air filter 11, an intake air temperature sensor 12, an airflow meter 13 as a load sensor, a compressor 14 of an exhaust gas turbocharger, a charge air cooler 15, a throttle valve 17, a pressure sensor 18, and an intake manifold pipe 19, which leads to a cylinder Z1 via an intake passage in the engine block 2. The throttle valve 17 may comprise a throttle element (E gas) controlled by an electric motor, whose opening cross-section, in addition to the actuation by the driver (driver request), can be adjusted, depending on the operating zone of the internal combustion engine 100, via signals from an electronic control device 8. At the same time a signal is output to the control device 8 for monitoring and checking the position of the throttle valve 17.

As shown, the engine block 2 comprises a crankshaft 21, which is coupled via a connecting rod 22 to a piston 23 of the cylinder Z1. The motive power generated by the combustion process is transmitted via the crankshaft 21 to the drive train of a motor vehicle (not shown). The piston 23 and the cylinder Z1 define a combustion chamber 24.

The cylinder head 3 comprises a valve drive with at least one gas inlet valve 31, at least one gas outlet valve 32, and drive devices (not shown in detail) for these valves. Here this takes the particular form of a so-called variable valve drive, in which the actuation of the at least one gas inlet valve 31 and/or the at least one gas outlet valve 32 is largely, or even fully, decoupled from the movement of the crankshaft 21. The cylinder head 3 further comprises a fuel injection valve (injector) 33 and a spark plug 34.

The exhaust gas manifold 4 leads off from the combustion chamber 24, in the further course of which are arranged a turbine 41 of the exhaust gas turbocharger, which is connected to the compressor 14 via a shaft (not further identified), an exhaust gas sensor 42 in the form of a lambda probe, and a catalytic converter 43. The catalytic converter 43 may be designed as a three-way catalytic converter and/or as a NOx storage catalytic converter. The NOx storage catalytic converter serves to enable compliance with the required exhaust gas limit values in lean-burn operating zones. By virtue of its coating, it adsorbs the NOx compounds generated in the exhaust gas under lean combustion conditions. Furthermore, a particulate filter may be provided in the exhaust gas manifold 4; this can also be integrated into the catalytic converter 43.

A bypass around the compressor 14 of the exhaust gas turbocharger with a divert-air valve, and a bypass around the turbine of the exhaust gas turbocharger with a wastegate valve, are not shown in the interests of clarity.

A fuel supply unit (only partially shown) is assigned to the internal combustion engine 100; this supplies the fuel injection valve 33 with fuel KST. Here the fuel KST is conveyed in a known manner from a fuel storage tank 5 by an electric fuel pump 51 (in-tank pump, low-pressure fuel pump) with a pre-filter, usually arranged within the fuel storage tank 5, at low pressure (typically <5 bar), and is then led via a low-pressure fuel line containing a fuel filter to an input of a high-pressure fuel pump. This high-pressure fuel pump is driven either mechanically by means of a coupling with the crankshaft 21 of the internal combustion engine 100, or electrically. It increases the fuel pressure in an Otto-cycle petrol driven internal combustion engine 100 to a value of typically 200-300 bar and pumps the fuel KST via a high-pressure fuel line into a high-pressure fuel storage tank (common rail), to which is connected a supply line for the fuel injection valve 33, and thus the fuel injection valve 33 is supplied with pressurized fuel, so that fuel can be injected into the combustion chamber 24.

The pressure in the high-pressure fuel storage tank is detected by a pressure sensor. Depending on the signal from this pressure sensor, the pressure in the high-pressure fuel storage tank is set to either a constant or a variable value by means of a pressure regulator. Excess fuel is returned either to the fuel storage tank 5 or to the input line of the high-pressure fuel pump.

A fuel vaporization restraint system 6, in what follows referred to simply as a tank venting device, is also associated with the internal combustion engine 100. A fuel vapor retention filter 61 belongs to the tank venting device 6; this contains, for example, activated carbon 62 and is connected via a connecting line 63 to the fuel storage tank 5. The fuel vapors generated in the fuel storage tank 5, especially the volatile hydrocarbons, are thus led into the fuel vapor retention filter 61 and are there adsorbed by the activated carbon 62. In the connecting line 63 between the fuel storage tank 5 and the fuel vapor retention filter 61, an electromagnetic shut-off valve 64 is inserted, which can be actuated by means of signals from the control device 8. This shut-off valve 64 is also referred to as a roll-over valve, which is automatically closed in the event of an extreme tilt or roll-over of the motor vehicle, so that no liquid fuel KST can leak from the fuel storage tank 5 into the environment, and/or enter into the fuel vapor retention filter 61.

The fuel vapor retention filter 61 is connected via a regeneration line 65 to the intake manifold 1 at a location downstream of the air filter 11 and upstream of the compressor 14. To adjust the gas flow in the regeneration line 65 a flow control valve 66 is provided, usually referred to as a tank venting valve, which can be controlled by means of signals from the electronic control device 8. The activation signal takes the form, in some embodiments, of a pulse width modulated signal (PWM signal).

In order that scavenging and thus a regeneration of the fuel vapor retention filter 61 can take place even with a dethrottled intake manifold pipe, or in supercharged operation of the internal combustion engine 100, an electrically driven scavenge air pump 67 is arranged in the regeneration line 65.

Furthermore, a venting line 68 is provided on the fuel vapor retention filter 61, which connects to the environment via an air filter 69. In the venting line 68 is arranged a venting valve 70, which can be controlled by means of signals from the electronic control device 8.

The scavenge air pump 67, also referred to as an active scavenge air pump (active purge pump, APP), may comprise an electrically driven centrifugal pump or radial pump and can be regulated in its rotational speed.

Upstream of the scavenge air pump 67, a pressure sensor 71 is provided in the regeneration line 65; this supplies a value p_up corresponding to the pressure at the inlet to the scavenge air pump 67. The pressure sensor 71 can also be integrated with a temperature sensor to form one component, so that the density of the scavenge gas and thus the vaporous fuel mass introduced into the intake manifold 1 can also be determined from an evaluation of these signals.

Downstream of the scavenge air pump 67, a pressure sensor 72 is provided in the regeneration line 65; this supplies a value p_down corresponding to the pressure at the outlet of the scavenge air pump 67.

Instead of two separate pressure sensors 71, 72, it is also possible to use a differential pressure sensor 73, as shown by a dashed line in FIG. 1, which supplies the signal corresponding to the pressure difference $\Delta APP = p\_down - p\_up$.

Various sensors are associated with the electronic control device 8; these detect measured parameters and determine the measured values of the measured parameters. Operating parameters, in addition to the measured parameters, also comprise parameters derived from the latter. As a function of at least one of the operating parameters, the control device 8 controls the actuators that are assigned to the internal combustion engine 100, and to each of which corresponding actuator drives are assigned, by the generation of actuating signals for the actuator drives.

The sensors are, for example, the airflow meter 13, which detects an airflow upstream of the compressor 14, the temperature sensor 12, which detects an intake air temperature, the ambient air pressure sensor 16, which provides a signal AMP, the pressure sensors 71, 72, 73, a temperature sensor 26, which detects the temperature of the coolant of the internal combustion engine 100, the pressure sensor 18, which detects the intake manifold pipe pressure downstream of the throttle valve 17, the exhaust gas sensor 42, which detects a residual oxygen content of the exhaust gas and whose measurement signal is characteristic of the air/fuel ratio in the cylinder Z1 in the course of combustion of the air/fuel mixture. Signals from further sensors that are necessary for the control and/or regulation of the internal combustion engine 100 and its ancillary components are identified in general terms by the reference symbol ES in FIG. 1. Depending on the various embodiments, any subset of said sensors may be present, or additional sensors may also be present.

The actuators, which the control device 8 controls by means of actuating signals, are, for example, the throttle valve 17, the fuel injection valve 33, the spark plug 34, the flow control valve 66, the shut-off valve 64, the venting valve 70 and the scavenge air pump 67. Actuating signals for further actuators of the internal combustion engine 100 and its ancillary components are indicated in the figure in general terms by the reference symbol AS.

In addition to the cylinder Z1, further cylinders Z2 to Z4 are also provided, to which corresponding actuators are also assigned.

The electronic control device 8 may also be referred to as an engine control unit. Such control devices 8, which usually include one or a plurality of microprocessors, are known, so that in what follows only the build relevant in the context of the invention and its operation will be discussed. The control device 8 may comprise a computing unit (processor) 81, which is coupled to a program memory 82 and a value memory (data store) 83. In the program memory 82 and the value memory 83 programs and values are respectively stored, which are necessary for the operation of the internal combustion engine 100. Inter alia, a function FKT_TEV for controlling the internal combustion engine 100 during a tank venting period is implemented in software in the program memory 82, in particular for determining and setting a desired value for the scavenge flow, and for determining the degree of loading of the fuel vapor retention filter 61. For this purpose, control electronics are provided in the control device 8 for controlling the scavenge air pump 67 and evaluating the pressure difference $\Delta APP$ built up by the scavenge air pump 67, as will be explained in more detail below.

With the aid of the scavenge air pump 67, it is possible to adjust the desired scavenge flow of the scavenge gas (HC/air mixture) from the fuel vapor retention filter 61 for all operating points of the internal combustion engine 100. With a high HC content in the scavenge gas, the scavenge flow must be smaller than in the case of a nearly empty fuel vapor retention filter 61. At the time of opening the flow control valve 66, the HC content in the scavenge gas must be known with high accuracy, since this must be taken into account in the calculation of the quantity of fuel to be injected for the current operating point of the internal combustion engine 100.

If the scavenge air pump 67 is operated with the flow control valve closed, the pressure difference $\Delta APP$ generated across the scavenge air pump 67 ensues in accordance with the following relationship:

$$\Delta APP = \frac{\rho}{2}(2\pi rf)^2$$

with
$\rho$ as the density of the scavenge gas,
f as the rotational speed of the impeller of the scavenge air pump
r as the radius of the impeller of the scavenge air pump As a result of the centrifugal forces of the medium conveyed, that is to say, of the scavenge gas in the scavenge air pump 67, the pressure generated at a predetermined rotational speed depends on the density of the scavenge gas.

The densities of hydrocarbons differ from the density of air. Thus, for example, at a temperature of 0° C. and ambient pressure, the density of air is approx. 1.29 kg/m$^3$ and the density of pure butane is 2.48 kg/m$^3$.

If the rotational speed f is constant, then the pressure difference $\Delta$APP is proportional to the density $\rho$ and is thus proportional to the HC content in the scavenge gas. If the flow control valve 66 is closed, no scavenge flow flows and the pressure p_up corresponds to the ambient pressure AMP.

Thus, by means of a brief pressure build-up by control of the scavenge air pump 67 with the flow control valve 66 closed, and a predetermined rotational speed of the scavenge air pump 67, conclusions can be drawn from the measured pressure difference $\Delta$APP as to the HC concentration in the scavenge gas. If this step is performed before the start of the actual scavenge phase (open flow control valve 66), the first-time opening of the flow control valve 66 can take place significantly faster and with a more accurate injection mass correction.

In the value memory 83 of the control device 8, a characteristics map KF is stored, in which, depending on the values of the pressure difference $\Delta$APP determined, related values for the HC concentration of the scavenge gas are stored. The characteristics map is determined experimentally on the test bed. The values for the pressure difference $\Delta$APP are either determined in the control device 8 from the individual pressure values P_up and P_down upstream or downstream of the scavenge air pump 67 by the formation of corresponding differences, or the values $\Delta$APP delivered by the differential pressure sensor 73 are entered directly.

The principle of determining HC concentration on the basis of the differential pressure across the scavenge air pump also functions during the scavenge process in combination with a pulse width modulated activation signal (PWM signal) for the flow control valve. For this purpose, it is only necessary to carry out the evaluation of the pressure signals in the control device at a sufficient sampling rate that is synchronous with the PWM control of the flow control valve. With a suitable downstream filtering process known per se a value for the differential pressure then ensues, which is proportional to the HC concentration of the scavenge gas.

Figure 2:
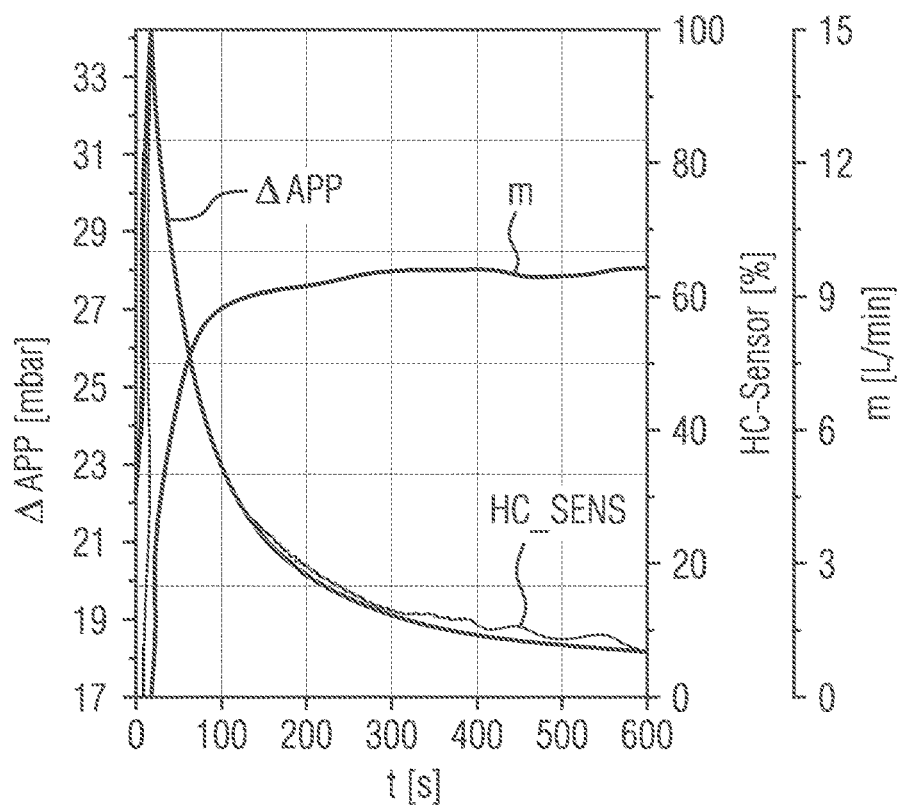
FIG. 2 shows a diagram for the relationship between the pressure difference across the scavenge air pump and the measured HC concentration over time with steadily decreasing HC concentration, in accordance with the teachings herein.

The diagram in FIG. 2 shows the time profile of the pressure difference $\Delta$APP determined in accordance with the inventive method, and the self-adjusting scavenge air mass flow rate m with steadily decreasing HC concentration. In addition, a characteristic HC_SENS is entered, which indicates the profile of the HC concentration, which is supplied by an HC sensor arranged upstream of the scavenge air pump 67, only for validating the correctness and usability of the specified method. From this it can clearly be seen that the above-described relationship is given with very great accuracy; the two curves $\Delta$APP and HC_SENS are almost identical.

Figure 3:
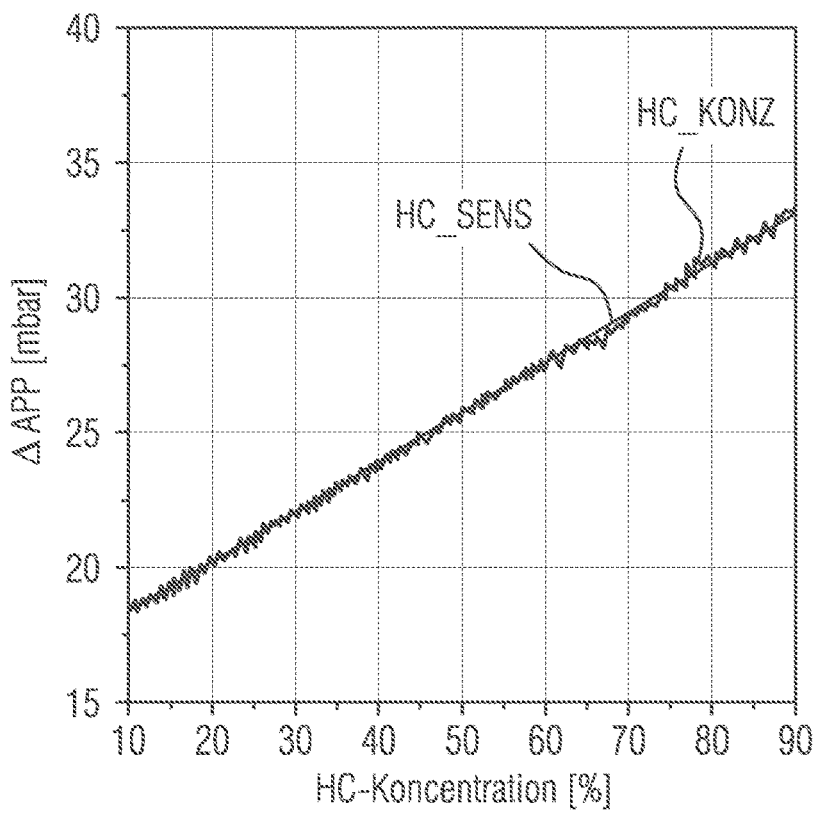
FIG. 3 shows a diagram for the relationship between the pressure difference across the scavenge air pump and the HC concentration, in accordance with the teachings herein.

In the diagram in FIG. 3, the relationship between the pressure difference $\Delta$APP and the HC concentration determined with the aid of the inventive method is shown (curve HC_KONZ). Here too the relationship between the pressure difference $\Delta$APP and the HC concentration HC_SENS is also plotted, which the above-cited HC sensor provides. The two curves are identical within the scope of the measuring accuracy. The pressure difference $\Delta$APP is directly proportional to the HC concentration.

Here the measurement or determination of the differential pressure $\Delta$APP was carried out with a scavenge air pump 67 designed as a centrifugal pump with a predetermined speed of 30 000 rpm and a PWM activation signal for the flow control valve 66 with a duty cycle of 50%. It is only necessary to hold the speed of the pump constant during the measurement/determination.

LIST OF TERMS AND REFERENCE SYMBOLS

1 Intake manifold
10 Intake opening
11 Air filter
12 Intake air temperature sensor
13 Airflow meter
14 Exhaust gas turbocharger compressor
15 Charge air cooler
16 Ambient air pressure sensor
17 Throttle valve
18 Pressure sensor for pressure downstream of the throttle valve
19 Intake manifold pipe
2 Engine block
21 Crankshaft
22 Connecting rod
23 Piston
24 Combustion chamber
26 Coolant temperature sensor
3 Cylinder head
31 Gas inlet valve
32 Gas outlet valve
33 Fuel injection valve
34 Spark plug
4 Exhaust gas manifold
41 Exhaust gas turbocharger turbine
42 Exhaust gas sensor, lambda probe
43 Catalytic converter
5 Fuel storage tank
51 Electric fuel pump, low-pressure fuel pump
6 Fuel vaporization restraint system
61 Fuel vapor retention filter
62 Activated carbon
63 Connecting line
64 Shut-off valve
65 Regeneration line
66 Flow control valve, tank venting valve
67 Scavenge air pump
68 Venting line
69 Air filter
70 Venting valve
71 Pressure sensor
72 Pressure sensor
73 Differential pressure sensor
8 Electronic control device
81 Computing unit, processor
82 Program memory
83 Data store, value memory
100 Internal combustion engine
AS Output signals
ES Input signals
FKT_TEV Function for controlling the internal combustion engine during a tank venting period
HC_SENS HC concentration obtained with an HC sensor
HC_KONZ HC concentration from pressure difference
KF Characteristics map
KST Fuel
P_up Pressure upstream of the scavenge air pump
P_down Pressure downstream of the scavenge air pump
$\Delta$APP Pressure difference
Z1-Z4 Cylinders

The invention claimed is:

1. A method for determining the loading of a fuel vapor retention filter in a fuel vaporization restraint system of an internal combustion engine and accounting for that loading in operation of the internal combustion engine, the method comprising:
   activating a scavenge air pump disposed in a regeneration line with the fuel vapor retention filter;
   upon reaching a constant speed of an impeller of the scavenge air pump conveying the scavenge air, detecting a pressure upstream of the scavenge air pump and a pressure downstream of the scavenge air pump;
   calculating a differential pressure across the scavenge air pump;
   determining the degree of loading of the fuel vapor retention filter based at least in part on the differential pressure; and
   adjusting a fuel injection time based on the degree of loading.

2. The method as claimed in claim 1, wherein the degree of loading is determined when the internal combustion engine is stationary and a flow control valve is closed, and the stationary value for the degree of loading is already taken into account in the first injection time calculation when starting the internal combustion engine.

3. The method as claimed in claim 1, wherein:
   the degree of loading is determined with the internal combustion engine running and a flow control valve open;
   the flow control valve is controlled by means of a pulse width modulated activation signal; and
   evaluation of the differential pressure takes place at a sampling rate synchronous with the control of the flow control valve.

4. The method as claimed in claim 1, further comprising referencing a characteristics map stored in a control device of internal combustion engine to determine the degree of loading.

5. The method as claimed in claim 4 wherein the values for the degree of loading stored in the characteristics map are determined on a test bed.

6. The method as claimed in claim 1, wherein:
   the pressure values are supplied by two separate pressure sensors; and
   the value for the differential pressure comprises a difference between the two pressure values.

7. The method as claimed in claim 1, wherein the value for the differential pressure is obtained by a differential pressure sensor with fluid connections open out into the regeneration line upstream and downstream of the scavenge air pump.

8. A control device for determining the loading of a fuel vapor retention filter in a fuel vaporization restraint system (6) of an internal combustion engine, the control device comprising a processor programmed to:
   activate a scavenge air pump disposed in a regeneration line with the fuel vapor retention filter;
   upon reaching a constant speed of an impeller of the scavenge air pump conveying the scavenge air, detect a pressure upstream of the scavenge air pump and a pressure downstream of the scavenge air pump;
   calculate a differential pressure across the scavenge air pump;
   determine the degree of loading of the fuel vapor retention filter based at least in part on the differential pressure; and
   adjust a fuel injection time based on the degree of loading.

9. An internal combustion engine comprising:
   a fuel storage tank for storing fuel;
   a connecting line coupling the fuel storage tank to a fuel vapor retention filter;
   a regeneration line coupling the fuel vapor retention filter to an intake manifold with an electrically controllable flow control valve;
   a venting line coupling the fuel vapor retention filter to the atmosphere;
   an electrically controllable scavenge air pump disposed in the regeneration line so that scavenge air can be led through the fuel vapor retention filter and supplied to the intake manifold for regeneration of the fuel vapor retention filter; and
   an engine control unit including a processor programmed to:
   activate a scavenge air pump disposed in a regeneration line with the fuel vapor retention filter;
   upon reaching a constant speed of an impeller of the scavenge air pump conveying the scavenge air, detect a pressure upstream of the scavenge air pump and a pressure downstream of the scavenge air pump;
   calculate a differential pressure across the scavenge air pump;
   determine the degree of loading of the fuel vapor retention filter based at least in part on the differential pressure; and
   adjust a fuel injection time based on the degree of loading.

* * * * *